(12) United States Patent
Nelson

(10) Patent No.: US 11,332,202 B2
(45) Date of Patent: May 17, 2022

(54) PEDESTRIAN SAFETY DEVICE WIND DIVERTER (PSDWD-10)

(71) Applicant: Lerrlyn Nelson, Detroit, MI (US)

(72) Inventor: Lerrlyn Nelson, Detroit, MI (US)

( * ) Notice: Subject to any disclaimer, the term of this patent is extended or adjusted under 35 U.S.C. 154(b) by 0 days.

(21) Appl. No.: 16/873,671

(22) Filed: Dec. 7, 2018

(65) Prior Publication Data

US 2021/0245820 A1 Aug. 12, 2021

(51) Int. Cl.
*B62D 35/00* (2006.01)
*B62D 29/04* (2006.01)
*G09F 7/18* (2006.01)
*G09F 21/04* (2006.01)

(52) U.S. Cl.
CPC ............ *B62D 35/00* (2013.01); *B62D 29/04* (2013.01); *G09F 7/18* (2013.01); *G09F 21/048* (2013.01); *G09F 2007/1843* (2013.01); *G09F 2007/1865* (2013.01)

(58) Field of Classification Search
CPC .......... B62D 35/00; B62D 29/04; G09F 7/18; G09F 21/048; G09F 2007/1843; G09F 2007/1865
See application file for complete search history.

(56) References Cited

U.S. PATENT DOCUMENTS

| 6,009,650 A | * | 1/2000 | Lamparter | B60Q 1/50 40/572 |
| 2007/0040412 A1 | * | 2/2007 | Buley | B62D 35/00 296/180.1 |
| 2011/0148140 A1 | * | 6/2011 | Benton | B62D 35/001 296/180.1 |
| 2013/0017084 A1 | * | 1/2013 | Anderson | F03D 3/068 416/1 |
| 2013/0112835 A1 | * | 5/2013 | Buley | B60R 1/078 248/476 |

* cited by examiner

*Primary Examiner* — Lori L Lyjak
(74) *Attorney, Agent, or Firm* — The Weintraub Group, P.L.C.

(57) ABSTRACT

The present invention provides a wind guard or shield or diverter which attaches to a vehicle side wall of greater dimension than that of the diverter and which surrounds an object, such as a school bus stop sign, a predetermined distance spaced from the diverter so as to provide an annular discharge space through which wind may flow while shielding the sign from contact by wind.

6 Claims, 6 Drawing Sheets

PEDESTRIAN SAFETY DEVICE WIND DIVERTER (PSDWD-10)

CROSS REFERENCE TO RELATED APPLICATION

This application is a continuation-in-part application of co-pending U.S. patent application Ser. No. 29/672,757, filed Dec. 7, 2018, for "Pedestrian Safety Device Wind Diverter" the disclosure of which is hereby incorporated by reference in its entirety, including the drawing.

BACKGROUND OF THE INVENTION

1. Field of the Invention

The present invention pertains to wind diverting. More particularly, the present invention pertains to wind diverters for use with vehicles. Even more particularly, the present invention concerns wind diverters for use with school bus stop signs.

2. Prior Art

As is known to the skilled artisan, wind is frequently distributed by various types of diverters, both horizontally and vertically, in which the wind is discharged and builds up behind various points from one end to another, for example, to prevent and/or minimize wind damage. Oftentimes, however, when wind is discharged, it forces various objects to vibrate adding additional pressure on any mechanism designed to hold the object in place. Particularly, when the speed of a moving object, such as a vehicle, is increased, the wind may gather behind the object forcing it to waver back and forth from its point of attachment.

The art has sought to address this issue. For example, one type of diverter is disclosed in U.S. Pat. No. 2,377,760. This diverter may be useful. It is limited. The problem of redirecting wind when using this diverter when wind is being discharged from a wall or support is that an object intended to be protected may come in various prior shapes, and structures, not only as an OEM installation, but as a retrofit device for diverting the wind around the object, thereby minimizing its universal application.

Although other prior art devices include certain types of shields associated with the discharge end of wind, none appear to be suitably adapted to solve the problem of effectively or simply shielding wind discharge from both horizontal and/or vertical passing wind.

Therefore, it would be advantageous to provide such a wind guard or shield which is particularly adapted to be mounted adjacent the upper end of the object to be protected. It is to this to which the present invention is directed.

SUMMARY OF THE INVENTION

The present invention provides a wind guard or shield or diverter which attaches to a vehicle side wall of greater dimension than that of the diverter and which surrounds an object, such as a school bus stop sign, a predetermined distance spaced from the diverter so as to provide an annular discharge space through which wind may flow while shielding the sign from contact by wind.

The diverter may be either an OEM installation or may be retrofitted and/or included as an attachment to existing bracketry and which permits adjustable movement of the diverter relative to the vehicle wall to which it is attached to adapt the structure to accommodate different wind discharge speeds as well as to provide effective shielding. When used as a retrofit, the useful life of the object to be protected is lengthened and its safety rating increased.

The diverter is secured to the vehicle wall. The diverter enables a stop sign to be extended and stowed without exposure to the elements.

Mounting brackets provide minimum obstruction of wind passage between the diverter and the vehicle wall.

The present diverter is particularly adapted to not only substantially reduce collection of wind behind the object to be protected, such as a school bus stop sign, when stowed, but to also limit the object from rocking back and forth when outwardly positioned, thereby stabilizing the object and aiding in the prevention of the object from becoming a potential hazard to others on the road and the safe transportation of children.

For a more detailed description of the present invention, reference is made to the following description and accompanying drawing. In the drawing, like reference characters refer to like parts throughout the several views, in which:

DETAILED DESCRIPTION OF THE INVENTION

At the outset, it is to be noted that the ensuing description will be made with reference to a school bus and school bus stop sign.

However, it is to be understood that the present invention is not intended to be so limited.

Figure 1:
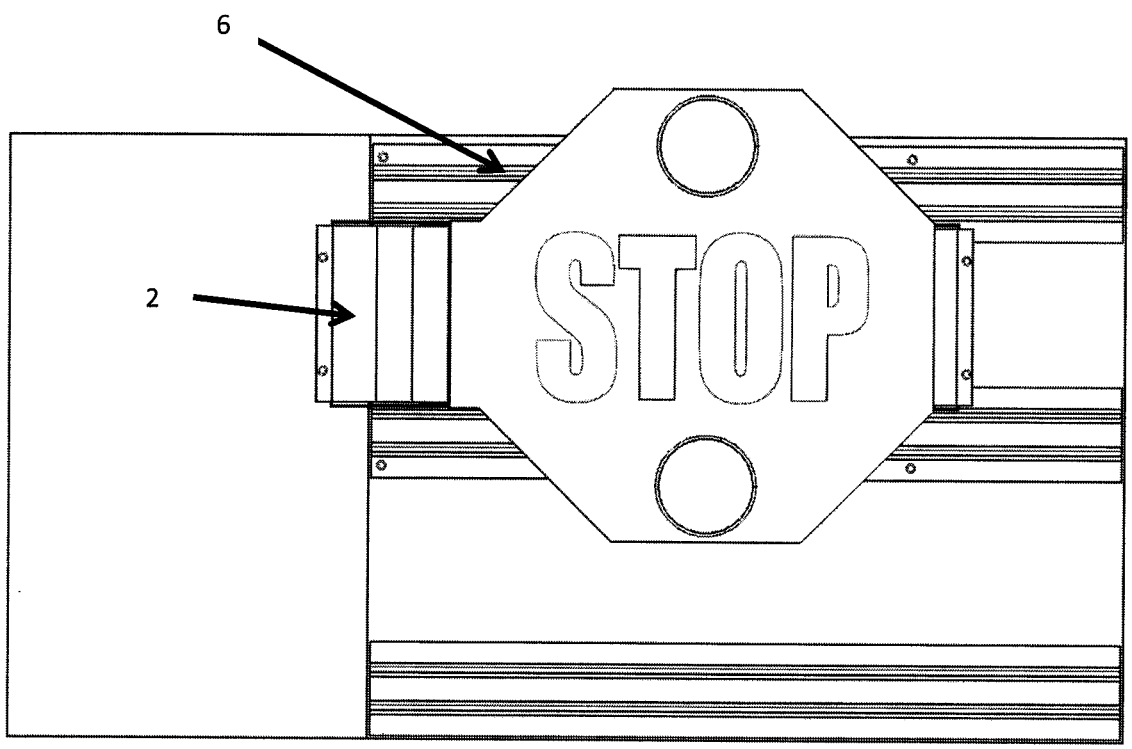
FIG. 1 is a plan view of an existing school bus sign installation.

In FIG. 1, there is shown an installation as including a school bus sign 13 including a cover 2 which encapsulates or covers the traditional linkage for causing the school bus sign 13 to rotate from a position parallel to a bus side wall 15 to a position normal to the vehicle or bus side wall 15. An intermediate flap or stop arm 6 interconnects the linkage to the sign 13 and limits the degree of rotation of the sign between 0° and 90°. Typically, the flap or stop arm is formed from a semiflexible rubber or similar material which provides sufficient flexure to enable the sign to rotate while at the same time exhibiting sufficient strength to preclude it from being torn away from the sign during heavy winds.

As discussed hereinafter the present diverter enables the sign to be rotated in the conventional manner while at the same time precluding wind from getting behind the sign when it is in the stowed or position parallel to the vehicle side wall. With school buses, as is known to the skilled artisan, it is conventional that the upper end of the present diverter be positioned such that it is capable of fully discharging wind passing therethrough.

Figure 2:
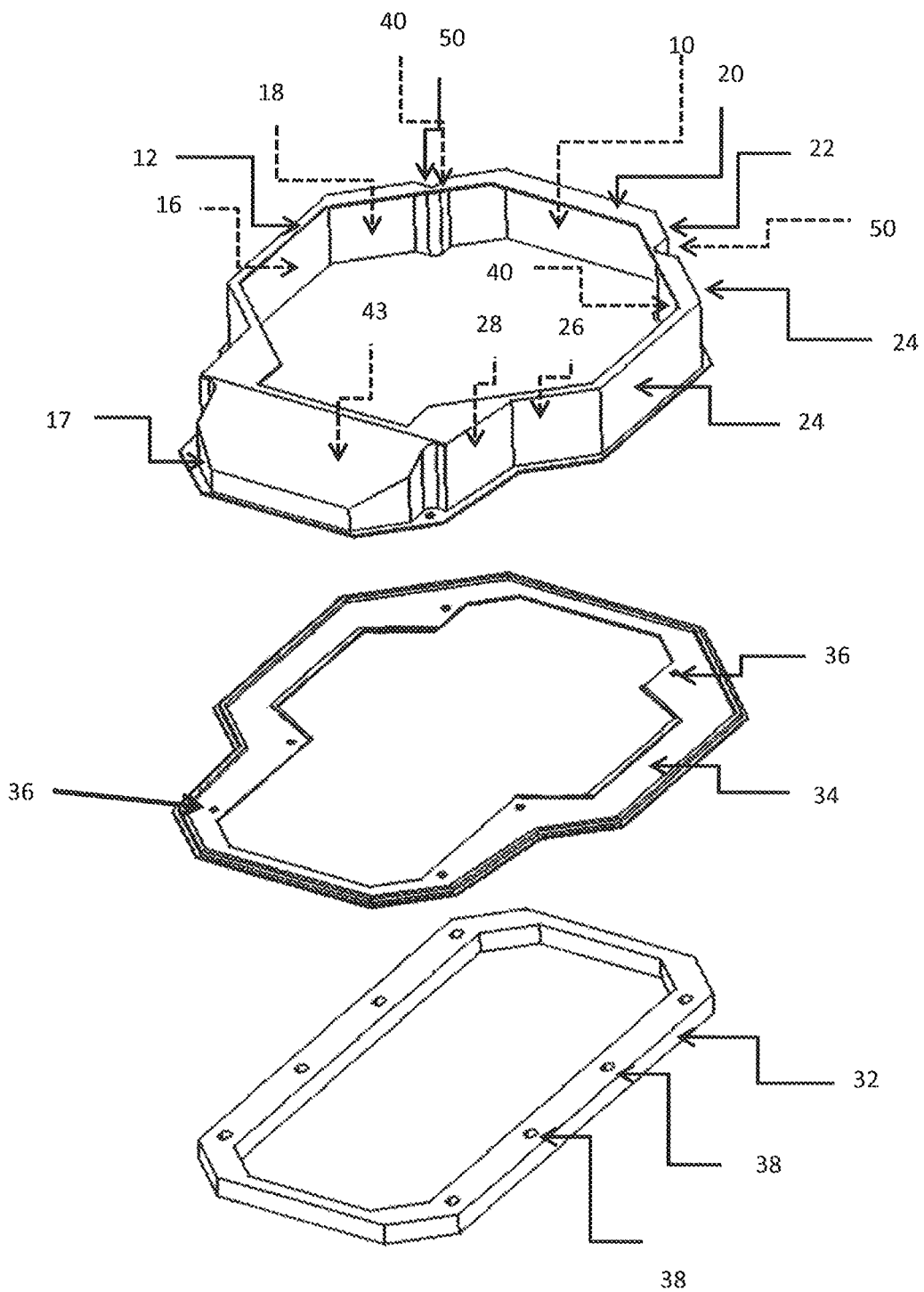
FIG. 2 is an exploded perspective view of the wind diverter hereof.
Figure 3:
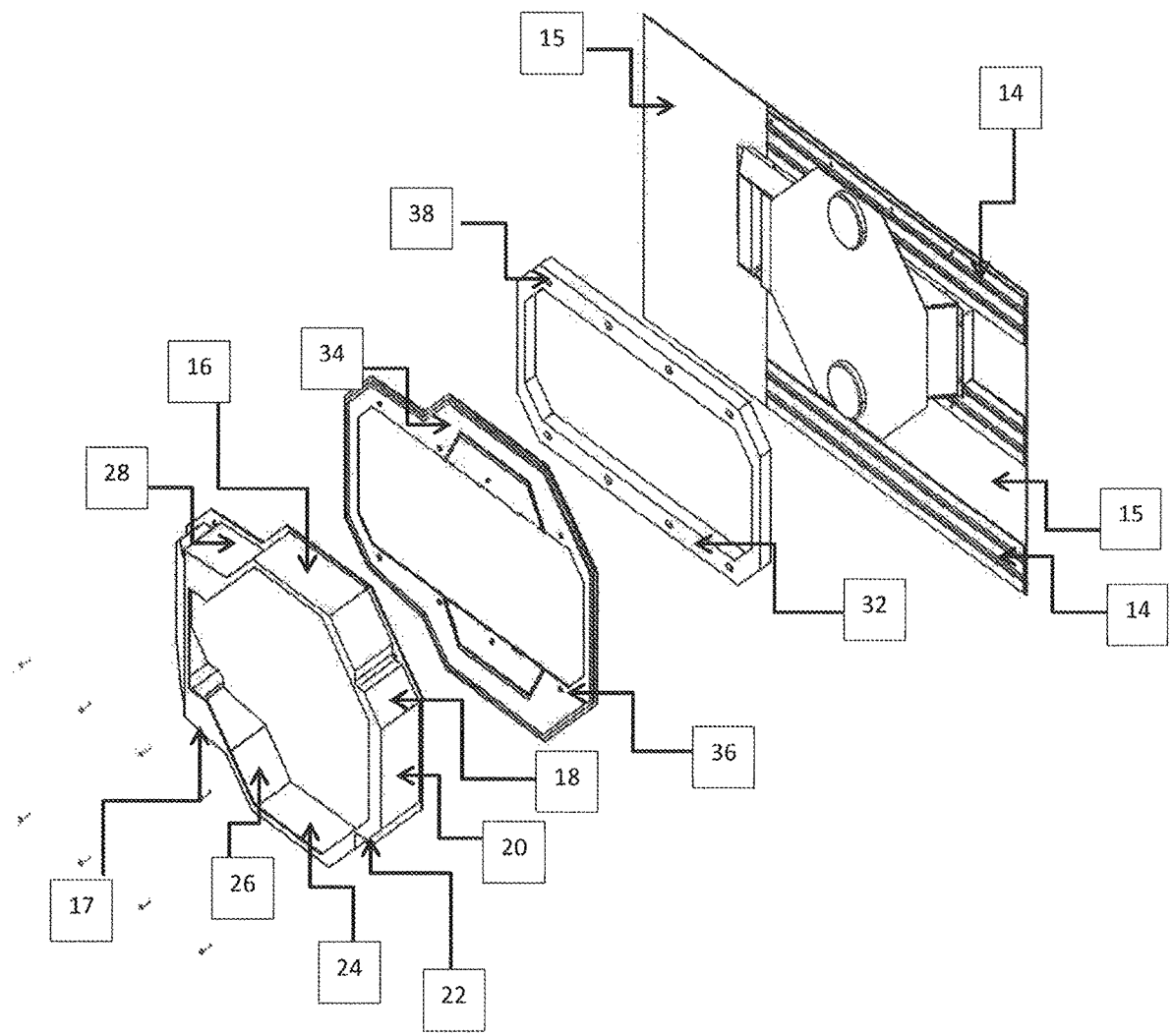
FIG. 3 is a second exploded perspective view showing the mounting of the diverter hereof to the side of a vehicle.
Figure 4:
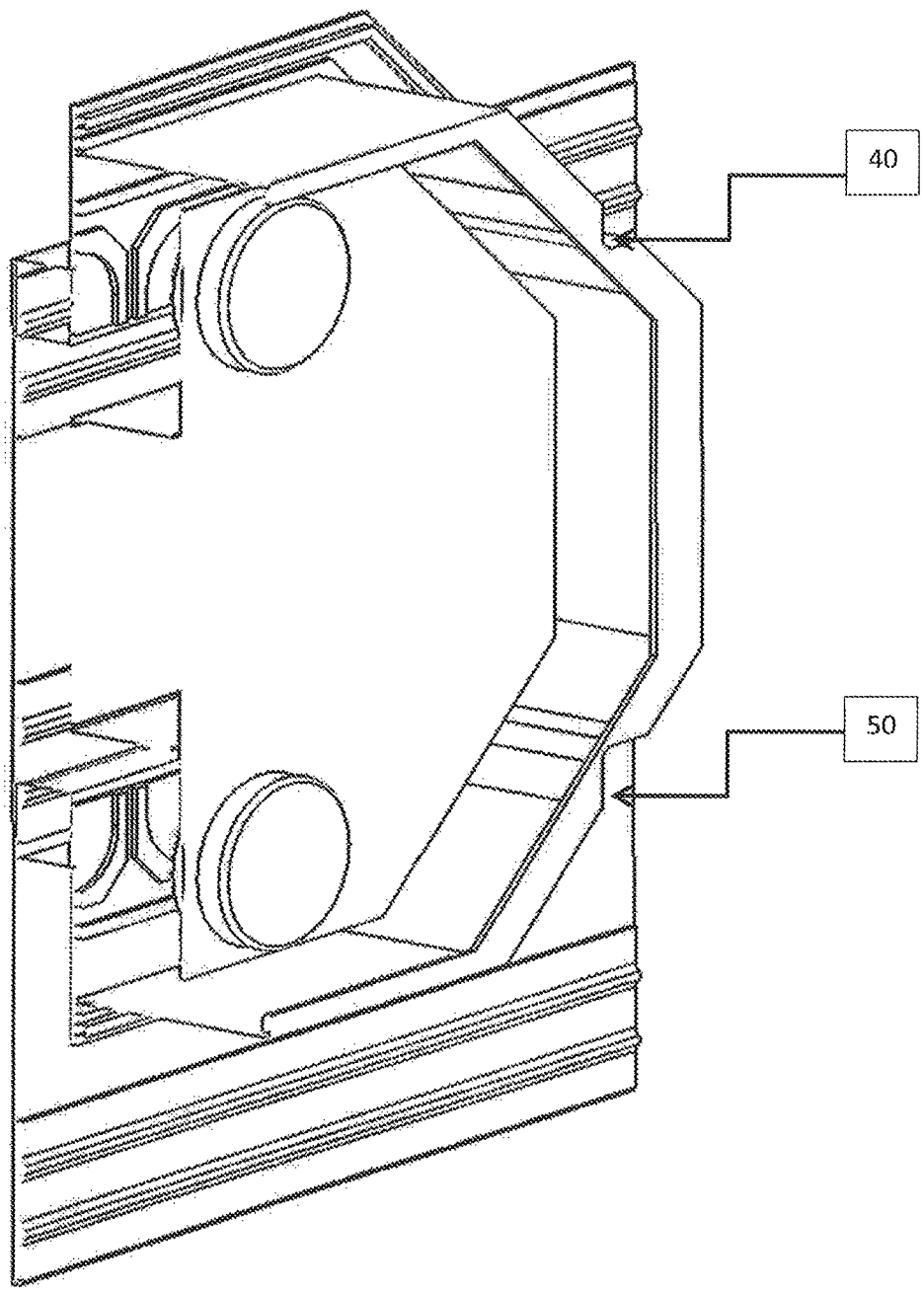
FIG. 4 is a view similar to FIG. 6, but showing the diverter hereof mounted to a vehicle with a school bus sign stowed therewithin.

Now, and with reference to the drawing and, in particular, FIGS. 2-4 a wind diverter 10, comprises a geometrically configured shield or guard, generally denoted at 12 which is so geometrically configured as having a complementary shape to a school bus sign 13, such that the sign may be nested therewithin when not in use.

The wind diverter 12 is mounted such that it precludes wind from passing in between the diverter, itself, and a vehicular wall, such as the side wall 15 of a school bus 14 to cause the stop sign 13 to become dislodged and to preclude it from flying off from its bracketry.

The diverter 10 is shown as a retrofit to the school bus 14 and mounts directly to the side wall 15 and is secured thereagainst. The present diverter includes a mounting bracket 17 which overlies the conventional school bus bracketry and linkages which include the rotating arm, etc. (not shown) to which the school bus sign 13 is interconnected via the flap or stop arm 6 and which enables rotation from a position in abutment against the wall 15 to being extended perpendicular or normal to the school bus wall in the well-known manner.

As shown, the shield or diverter or guard has the same outline or configuration as the sign 13, and is, therefore, complementarily configured thereto. Thus, when used for a school bus stop sign, the shield has an octagonal shape and includes a top or first wall 16, a second side wall 18 angularly disposed with respect to the top wall 16, a third wall 20, angularly disposed to the second side wall and extending substantially along a vertical axis, a fourth wall 22, angularly inclined with respect to the third wall 20, a fifth or bottom wall 24, which is substantially parallel to the top wall 16. To conform to the shape of the stop sign 13, sixth and seventh walls 26, 27 and an end wall 28 enshroud and encircle the sign when stowed therewithin and are integral with the other walls defining the diverter.

Preferably, the top wall 16 has a downward slope imparted thereto to enable any precipitation or moisture, such as rain, dew, or the like, to drain off of the diverter.

The shield is preferably made of a durable hard plastic material, such as a polycarbonate, or the like.

As shown in the drawing, the diverter 12 hereof further includes a seal 32 which lies therebelow. The seal has a plurality of openings or socket members 50. The openings or socket members 50 are enlarged to enable rotational or axial adjustment of the diverter to accommodate tolerances in mounting the diverter to the side wall.

A gasket 34 lies below the seal and is similarly multi-apertured such as at 38 and which apertures are spaced apart along the perimeter of the gasket, as shown.

Figure 5:
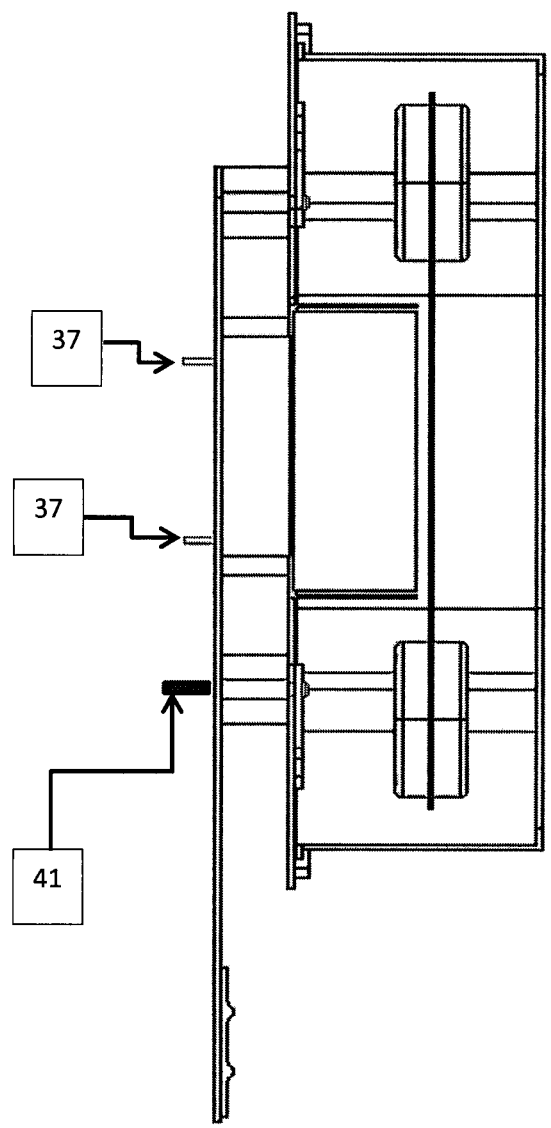
FIG. 5 is a side view showing the combined diverter and sign mounted to the side of the bus.
Figure 6:
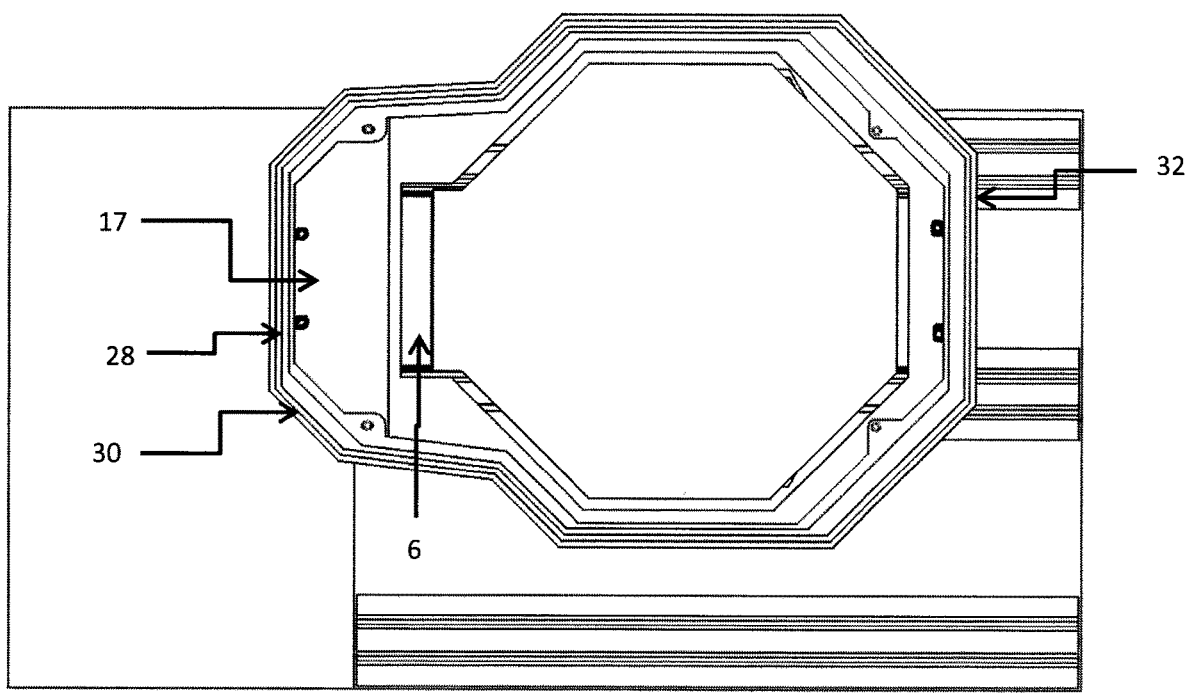
FIG. 6 is an end view showing the stowed stop sign within the diverter hereof.

As shown in FIG. 5, fasteners 37 project through both the gasket and the seal openings to enable the gasket and seal so as to be mounted to the side wall 15.

It is to be noted, and as shown in the drawing, each of the walls 18, 20, 22 are provided with substantially semi-circular or "u" shaped recesses 40. A plurality of mounting bolts 41 (FIG. 5) extend therealong and similarly secure the shield to the gasket and the seal to enable the diverter to be directly mounted to the side wall.

As shown in the drawing, the end wall 28 includes a recess or cut-out 43 which accommodates the flap or stop arm 6 such that the end wall 28 defines a stop to limit the rotational movement of the stop arm or flap when the sign 13 is rotated to a position normal to the side wall of the school bus.

Referring again to the drawing, as noted above, the shield includes a cover 2 which covers the conventional mounting bracket (not shown) used to mount the sign 13 to the side wall 15 of the vehicle 14. In use, the driver rotates the sign in the normal manner, and dislodges the school bus sign from the shield.

The gasket 34, preferably, comprises a suitable strip of pliable and compressible foam of appropriate width and thickness, such as PVC Foam Board.

Each bracket 30 is fixedly secured against the inner surface of the vehicle wall by suitable means, such as by plastic welding or the like.

Each bracket is provided with an offset leg 36, each of suitable length to permit a limited range of axial adjustment of the tubular wall, relative to the upper end of the diverter.

Each bracket is provided with an offset leg 34, 36, each of suitable length to permit a limited range of axial adjustment of the tubular wall, relative to the upper end of the diverter.

As noted, the diverter position can be adjusted and maintained by the securing means which includes the threaded fasteners 37, which are threadably projecting through an associated socket member and the securing bolts 41 which extends through an aligned hole in the outer wall of the seal.

As noted above, to permit such adjustment of the diverter with respect to the side wall 15. The fasteners are received in suitable socket members. The fasteners which are of limited length but adequate to provide effective support for the diverter in a desired adjusted position.

As a result of this arrangement and as shown in FIGS. 2 and 4, it will be seen that in the preferred construction of the diverter, the tube is arranged so that the bearing bracket is positioned nearest the axis and the mounting brackets. This provides an unobstructed portion of the annular space about the diverter to readily discharge wind from the upper end of the diverter and permit the same to fall by gravity toward the lower end of the diverter.

Further, it is readily perceived that as the wind blows in a direction toward the diverter, the diverter will direct the wind upward or vertically, and the wind will be discharged as a stream and fall by gravity toward the lower end of the bus wall. Because the upper end of the bus side wall 15 extends substantially beyond the bounds of the diverter, there is little, if any, possibility for wind passing through/under the sign to carry any of the wind with it beyond the boundary of the diverter.

It readily can be visualized that, depending upon the volume of wind being discharged from the device, as well as the speed of the vehicle, it may be desirable from time to time and under certain circumstances, to replace the diverter. This may be readily accomplished by loosening the securing plastic and locknuts, removing the diverter in the desired axial direction, and then replacing it by re-clamping the supporting or mounting brackets with respect to the socket members and re-applying new securing plastic strips.

While the invention has been described and illustrated in its several preferred embodiments, it should be understood that the invention is not to be limited to the precise details herein illustrated and described since the same may be carried out in other ways falling within the scope of the invention as illustrated and described.

REFERENCE NUMERALS 2 cover
6 flap
10 diverter
12 shield, guard
13 sign
14 bus, vehicle 15 school bus side wall
16 first or top wall
17 cover
18 second side wall
20 third wall
22 fourth wall
24 fifth/bottom wall
26 seventh wall
28 end wall
30, 32 bracket
32 seal
34 gasket
36 socket members
37 fasteners
41 fasteners
43 end wall recess
50 socket members

I claim:

1. A wind diverter for distributing wind around a desired object to prevent the wind from gathering behind the object, comprising:
   (a) a geometric shield shape configured complementary to the object to be shielded from wind;
   (b) means for attaching the wind diverter to a vehicular wall; and
   (c) means for adjusting the position of the wind diverter adjacent to the vehicular wall.

2. The wind diverter according to claim 1 wherein the wind diverter is fixed at one end thereof to the vehicular wall, the diverter being mounted parallel to the wall, the wind diverter including a mounting bracket, the bracket having an offset leg for adjustable movement therewith and means for securing the object to the support bracket.

3. The wind diverter of claim 2 which further includes a foam strip material.

4. The wind diverter of claim 3 which further comprises:
   (a) a planar substantially U-shaped bracket having a substantially equal thickness of said foam strip material of said mounting bracket and receiving the same in relatively close slidable relationship; and
   (b) securing means by a socket and moveable into clamping engagement with said offset leg portion of said supporting bracket.

5. The wind diverter of claim 1 wherein the wind diverter has a slope which extends a limited distance beyond the ends of the shielded object to prevent the pooling of moisture around the wind diverter.

6. A wind diverter comprising:
   (a) a vehicular wall of proportionate diameter to an object to be shielded and of similar cross-sectional shape surrounding the upper end of the object to provide a circumferential discharge space between the object and a parallel vehicular wall and entirely around the circumference of the object;
   (b) means to support an object against a support vehicular wall with the upper end thereof extending axially a predetermined distance beyond the upper projecting end of the object and the lower end extending below the upper end of the object; and wherein the wind diverter has a slope which extends a limited distance beyond the ends of the shielded object to prevent the pooling of moisture around the wind diverter.

* * * * *